March 27, 1934.  L. BRAND  1,952,968
SMOKEHOUSE
Filed July 25, 1932   2 Sheets-Sheet 1

INVENTOR
Leo Brand
BY
ATTORNEYS

March 27, 1934.  L. BRAND  1,952,968
SMOKEHOUSE
Filed July 25, 1932 2 Sheets-Sheet 2
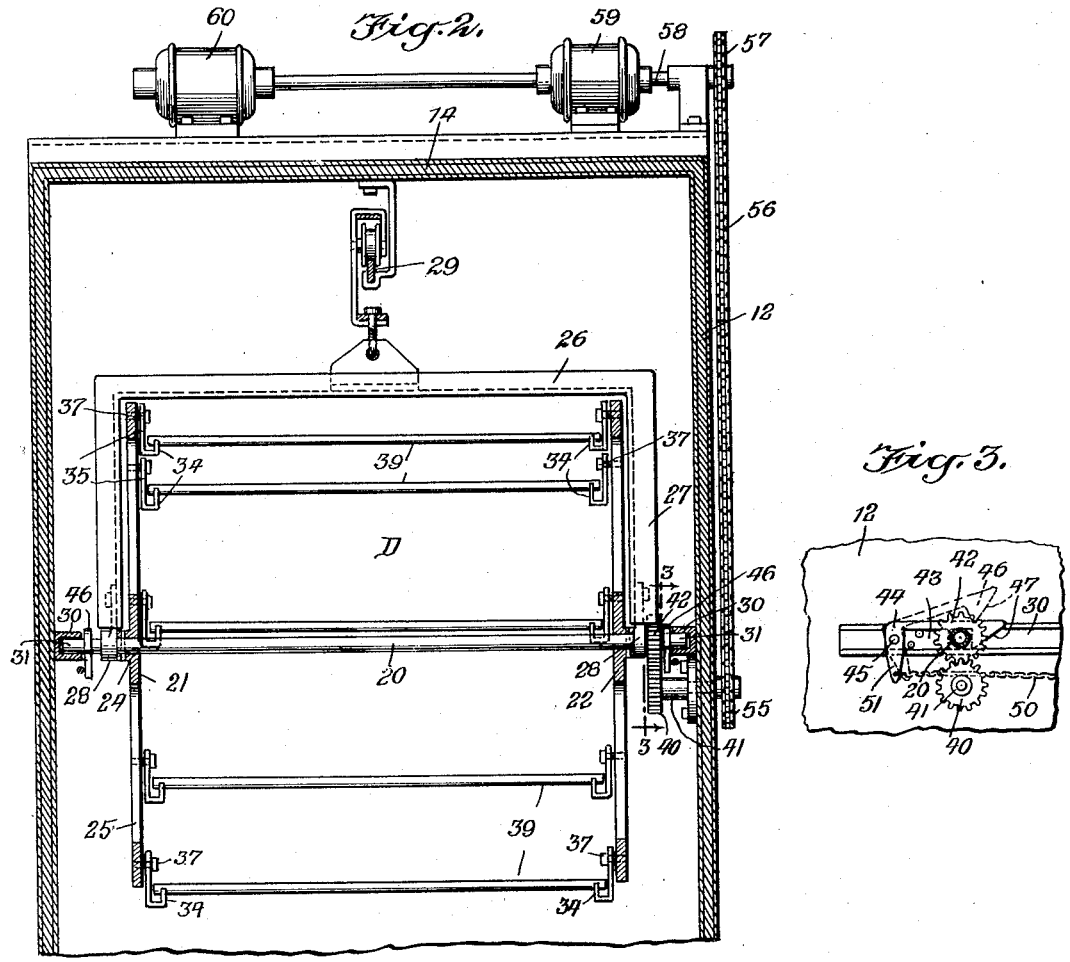
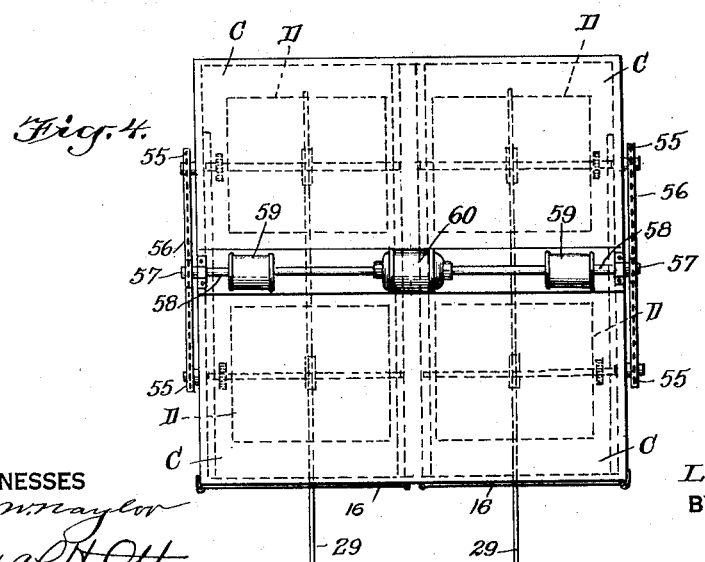
WITNESSES
INVENTOR
Leo Brand
BY
ATTORNEYS Patented Mar. 27, 1934

1,952,968

UNITED STATES PATENT OFFICE 1,952,968

SMOKEHOUSE

Leo Brand, New York, N. Y.

Application July 25, 1932, Serial No. 624,597

2 Claims. (Cl. 99—2)

This invention relates to smoke houses for smoking and curing meats, and refers more particularly to a cage for supporting the meats to be treated and driving mechanism therefor, said invention being in the nature of an improvement upon my prior United States Letters Patents Nos. 1,524,533, 1,554,906, and 1,704,850 and upon my co-pending application Serial No. 552,971 filed July 24, 1931.

The present invention comprehends in a smoke house, a meat supporting cage mounted therein for turning movement on a horizontal axis extending transversely of the smoke house and in which the cage includes a plurality of racks which are freely suspended from the cage headers so that the racks turn with and with respect to the cage while being maintained by gravity in parallel relation to the smoke house floor.

The invention further embodies a novel form of means for coupling and driving the cage when located in a predetermined position in the smoke house and for releasably retaining the cage in said coupled relation to the driving means.

As a further feature the invention aims to provide a cage construction and driving mechanism therefor by virtue of which a battery of smoke houses may be so arranged as to admit of the driving of the cages of the several smoke houses by common motor.

The invention further resides in a cage structure and driving mechanism therefor which embodies few and simple parts, capable of economical production and assembly and which makes for efficiency in operation and low maintenance costs.

These and other objects will be more fully appreciated as the nature, purpose and operation of the invention is better understood by reference to the following specification and accompanying drawings in which there is disclosed a preferred embodiment of the invention while the appended claims mark out and define the actual scope thereof.

In the drawings:

Figure 2 is a vertical transverse sectional view taken approximately on a plane indicated on the line 2—2 in Figure 1.

Figure 3 is a fragmentary detailed sectional view illustrating the releasable means for retaining the cage in coupled relation to the driving means.

Figure 4 is a plan view on a reduced scale illustrating the manner in which a battery of smoke houses and cages are co-related and driven by a common motor.

Figure 1:
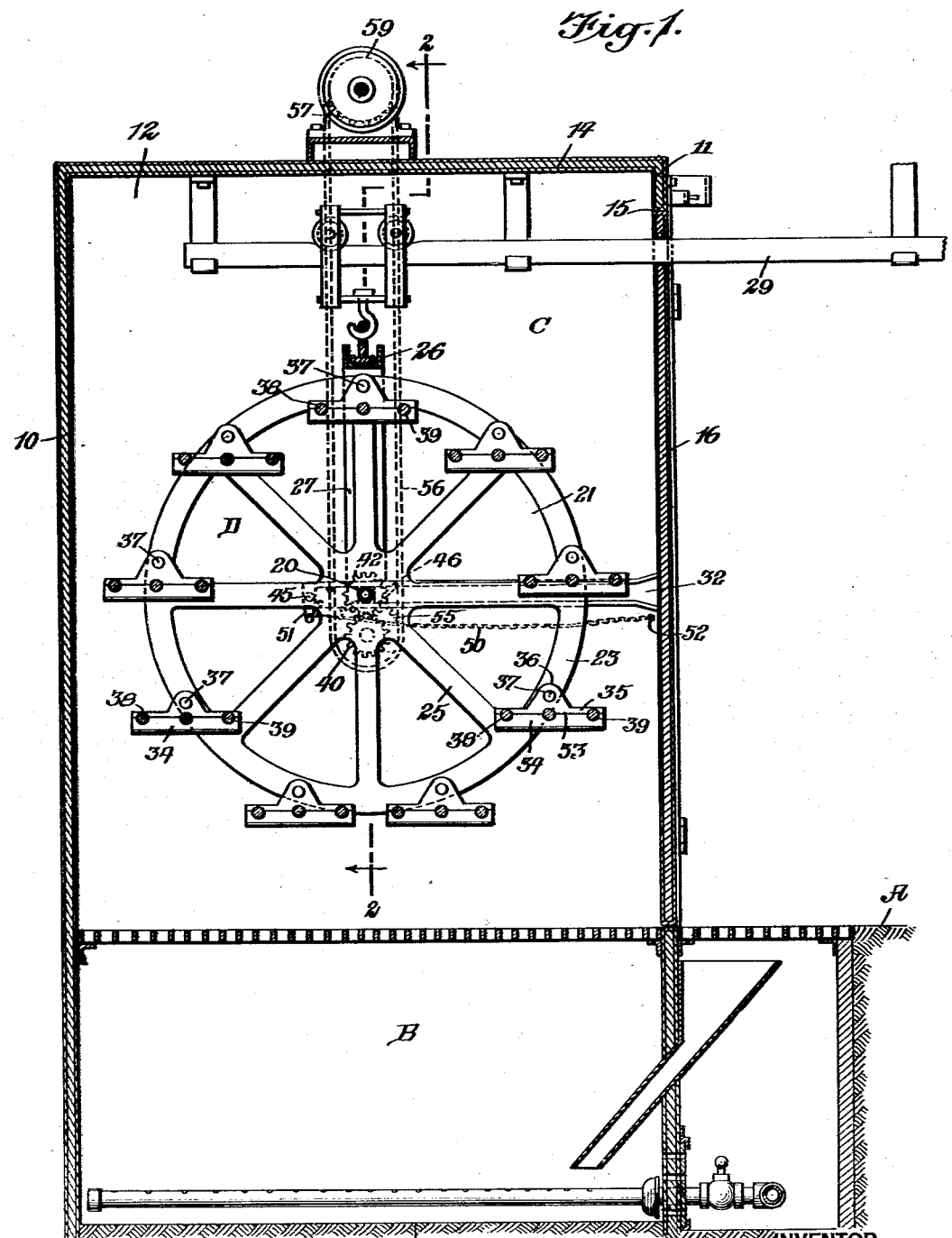
Figure 1 is a vertical sectional view through a smoke house and a cage constructed in accordance with the invention.

Referring to the drawings by characters of reference, the smoke house includes a rear wall 10, a front wall 11, side walls 12, a bottom wall 13 and a top wall 14. The front wall 11 is provided with an opening or doorway 15 which is designed to be closed by a bar or hinged doors 16. The lower portion of the enclosure, at a point below the lower edge of the doorway 15 is disposed below the level of the ground or floor line A, and said lower portion of the smoke house defines a burner compartment B below the floor line level A, while the upper portion constitutes a smoking compartment C.

The cage which constitutes the present invention and is designated generally by the reference character D, consists of a shaft 20 and a pair of headers 21 and 22, which headers in the present instance are in the form of a wheel having a rim portion 23, a hub portion 24 and radial spokes 25. The headers 21 and 22 are secured to and spaced longitudinally of the shaft 20 and within the ends of the shaft so that said ends protrude beyond the headers. A suitable cage supporting frame or carriage 26 is provided which includes depending side legs 27 carrying at the lower ends thereof journal bearings 28 by virtue of which the cage is journalled for rotation in the frame or carriage 26. In the present instance the frame or carriage is suspended from an overhead track 29 which extends through the doorway whereby the cage may be moved into and out of the smoking compartment C of the smoke house. It should, however, be noted that in the present instance it is unimportant how the cage and its carriage are supported for movement into and out of the smoking compartment. The shaft 20 of the cage, however, is disposed transversely of the smoke house, the side walls 12 of which are formed on their inner sides with guideways 30 in the form of channels which cooperate with the terminals 31 of the shaft. The outer ends of the guideways are flared as at 32 to facilitate the introduction of the shaft terminals 31 to the guideways when the cage is moved into the smoke house. The cage further includes a plurality of racks journalled on axes parallel to the cage axis for turning movement with and with respect to the cage. As illustrated, each rack comprises a pair of channel-shaped supports 33 respectively carried by the rims 23 of the headers 21 and 22. The supports 33 include inner and outer flanges 34 and 35, the latter flanges 35 being of greater height than the inner flanges 34, and said outer flanges being formed with an upstanding medial lug 36 which is journalled on a fulcrum 37 of the rim 23. The upper edge of the inner flange 34 is provided with a series of notches 38 which accommodate removable sticks or rods 39. The sticks or rods 39 may either serve in the capacity of a platform upon which hams, bacon or similar meats may be supported by the rack structure, or from which sticks or rods links of sausages may be suspended. As shown, the racks are circumferentially spaced on the rims 23 at a sufficient distance from each other so as not to interfere during the turning of the cage.

In order to provide means for driving the cage and for facilitating the coupling and uncoupling of the same with the driving means, a driving gear 40 is secured to a countershaft 41 which extends inwardly through a side wall of the smoke house while one of the shaft terminals 31 of the shaft 20 is provided with a pinion 42 between the extremity of the terminal and the journal bearing 28. The arrangement of the gear and pinion is such that as the cage is shifted into the smoke house the teeth of the pinion roll into mesh with the teeth of the driving gear 40. In order to position the pinion 42 with reference to the drive gear 40 stop elements 43 are provided in the guides 30 with which the shaft terminals abut. In order to retain the cage in position to be driven, a latch 44 is provided which is fulcrumed at 45 and which is provided with a bill 46 having an inclined forward face 47. In practice two of the latches are employed, one for each terminal 31. As the shaft terminals 31 approach the stop elements 43 they engage with the inclined forward faces 47 of the latch bills and lift the latches. At the point of engagement of the terminals 31 with the stop elements 43, the latch elements lower by gravity and the bills 46 engage over the terminals 31, thereby retaining the cage and maintaining the pinion 42 in mesh with the drive gear 40. In order to facilitate the release of the latches without the necessity of entering the smoke house, a chain or cable or other flexible element 50 is connected to the angularly disposed arm 51 of each latch, and has its forward extremity anchored at 52 to the side wall 12 adjacent the doorway. Obviously, a pull exerted on the chain or cable swings the latch upwardly to dispose the bill 46 out of the path of movement of the shaft terminal.

The countershaft 41 may be driven in any desired manner but, as illustrated, the protruding end of the shaft 41 has secured thereon a sprocket 55 around which is trained a sprocket chain 56 leading up to a sprocket 57 secured to the drive shaft 58 of a reducing gearing in a housing 59 which gearing is driven by a suitable motor 60.

In order to disclose how an arrangement of a battery of smoke houses may be disposed to be driven by a common motor 60, Figure 4 shows four smoking compartments each of which accommodates a cage D. The countershafts and gearing of one pair of cages D are driven from a common drive shaft 58 of a reducing gear housing 59 and driven by the motor 60 while the other pair of cages D are driven by an alined drive shaft 58 through a reducing gear housing 59. In this instance the rear cages D are initially shifted into position and coupled with the driving mechanism and subsequently the forward cages are implaced in the forward smoking compartment.

What is claimed is:

1. In a smoke house having a smoking compartment, a non-rotary carriage movable into and out of said compartment, a cage including a horizontal rotary shaft journalled in the carriage and extending transversely of the smoke house, a pair of headers secured to and spaced longitudinally of the cage shaft, and guideways for the shaft terminals extending horizontally from the front to the rear of the opposite inner sides of the smoke house.

2. A device for supporting articles to be smoked in a smoke house including a cage and a carriage therefor adapted to be moved into and out of the smoke house, said cage being journalled in the carriage for rotation on a horizontal axis extending transversely of the smoke house, said cage including a plurality of racks journalled on axes parallel to the cage axis for turning movement with and with respect to the cage, and said cage comprising a rotary shaft, a pair of headers secured to and spaced longitudinally of the shaft and within its ends, and guideways located within the smoke house for engaging with the terminals of the shafts which protrude beyond the headers.

LEO BRAND.